(12) United States Patent
Menegoli

(10) Patent No.: US 6,653,805 B2
(45) Date of Patent: Nov. 25, 2003

(54) METHOD AND APPARATUS FOR SPINNING A MULTIPHASE MOTOR FOR A DISK DRIVE SYSTEM FROM AN INACTIVE STATE

(75) Inventor: Paolo Menegoli, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 61 days.

(21) Appl. No.: 10/085,560

(22) Filed: Feb. 26, 2002

(65) Prior Publication Data

US 2002/0079852 A1 Jun. 27, 2002

Related U.S. Application Data

(62) Division of application No. 09/643,218, filed on Aug. 18, 2000.

(51) Int. Cl.$^7$ ............................................... H02K 23/00
(52) U.S. Cl. ...................... 318/254; 318/138; 318/439; 318/459; 318/369; 318/377
(58) Field of Search ................................. 318/377, 368, 318/138, 254, 439, 459; 360/105

(56) References Cited

U.S. PATENT DOCUMENTS

| | | | |
|---|---|---|---|
| 4,862,052 A | 8/1989 | Unsworth et al. | 318/757 |
| 4,876,491 A | 10/1989 | Squires et al. | 318/138 |
| 4,992,710 A | 2/1991 | Cassat | 318/254 |
| 5,001,405 A | 3/1991 | Cassat | 318/254 |
| 5,003,241 A | 3/1991 | Rowan et al. | 318/761 |
| 5,028,852 A | 7/1991 | Dunfield | 318/254 |
| 5,117,165 A | 5/1992 | Cassat et al. | 318/254 |
| 5,172,036 A | 12/1992 | Cameron | 318/138 |
| 5,187,419 A | 2/1993 | DeLange | 318/805 |
| 5,191,270 A | 3/1993 | McCormack | 318/254 |
| 5,202,614 A | 4/1993 | Peters et al. | 318/254 |
| 5,254,914 A | 10/1993 | Dunfield et al. | 318/254 |
| 5,276,569 A | 1/1994 | Even | 360/73.02 |
| 5,343,127 A | 8/1994 | Maiocchi | 318/254 |
| 5,397,971 A | 3/1995 | McAllister et al. | 318/254 |
| 5,455,885 A | 10/1995 | Cameron | 388/834 |
| 5,466,997 A | 11/1995 | Utenick et al. | 318/254 |
| 5,473,725 A | 12/1995 | Chen et al. | 318/254 |
| 5,504,402 A * | 4/1996 | Menegoli | 318/377 |
| 5,569,990 A | 10/1996 | Dunfield | 318/254 |
| 5,751,128 A | 5/1998 | Chalupa et al. | 318/439 |
| 5,850,129 A | 12/1998 | Yoshino | 318/254 |
| 5,936,365 A | 8/1999 | Li et al. | 318/439 |
| 5,969,491 A | 10/1999 | Viti et al. | 318/254 |
| 6,023,141 A | 2/2000 | Chalupa | 318/439 |
| 6,078,158 A | 6/2000 | Heeren et al. | 318/430 |
| 6,091,222 A | 7/2000 | Vertemara et al. | 318/701 |
| 6,236,174 B1 | 5/2001 | White | 318/254 |
| 6,369,534 B1 * | 4/2002 | Menegoli | 318/254 |

OTHER PUBLICATIONS

Leos Chalupa, "Low Cost High Efficiency Sensorless Drive for Brushless DC Motor Using MC68HC(7)05MC4"; *Motorola Semiconductor Application Note*, 1999; 28 pages.

\* cited by examiner

*Primary Examiner*—Karen Masih
(74) *Attorney, Agent, or Firm*—Lisa K. Jorgenson; Andre Szuwalski

(57) ABSTRACT

A method and apparatus are disclosed for controlling the operation of a multiphase motor, and particular to spinning the motor from an inactive state to an operable state. The method and apparatus include initially sensing an electrical characteristic of one or more phase windings, such as performing an inductive sense operation. Having sensed values of the electrical characteristic, a determination is made as to whether or not the motor's rotor is spinning. Upon a determination that the rotor is not spinning, a spin-up operation is performed to bring the spin of the rotor to operable spin speeds. On the other hand, upon a determination that the rotor is spinning, a resynchronization operation is performed to synchronize the application of drive signals for the phase windings of the motor to the dynamic position of the rotor.

16 Claims, 3 Drawing Sheets

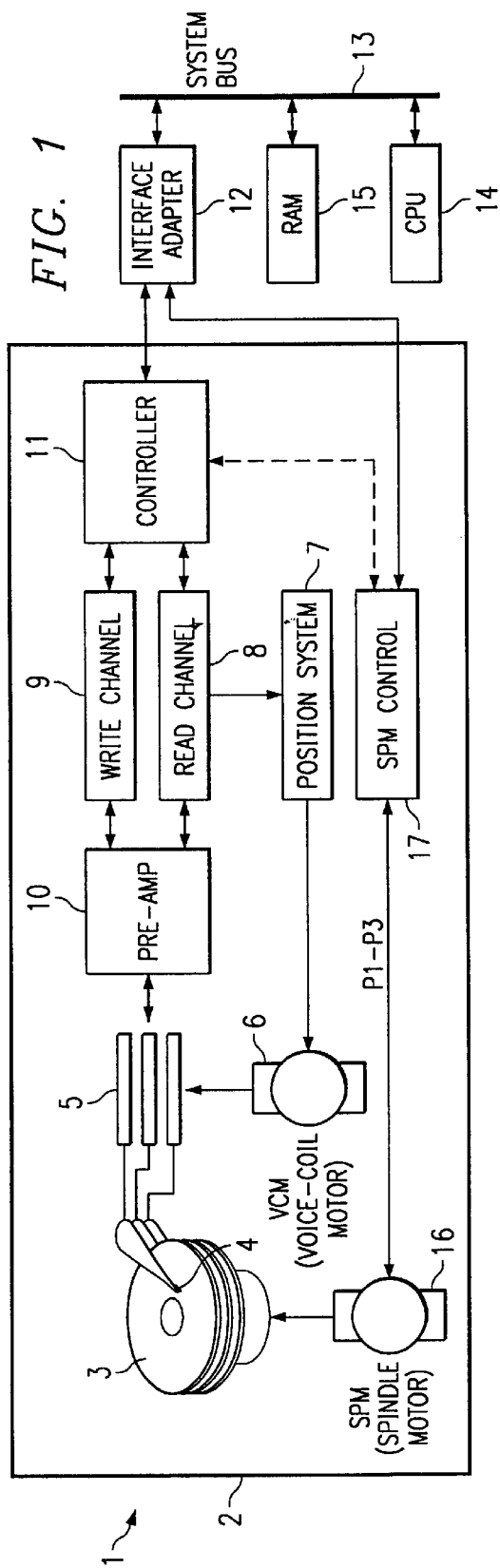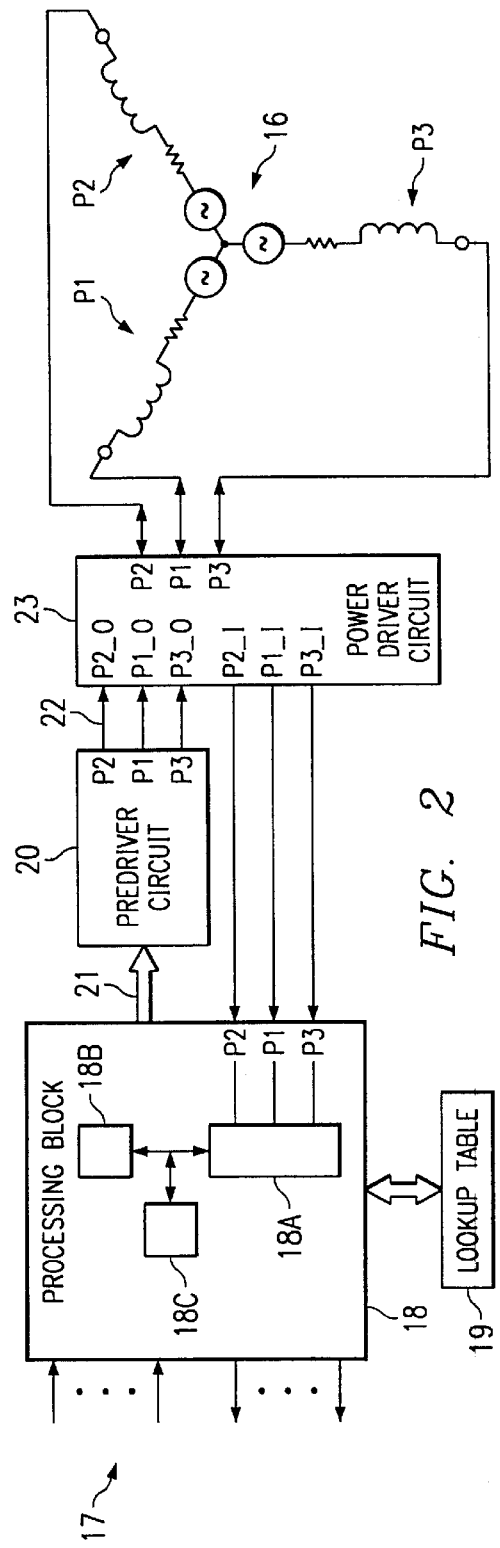

METHOD AND APPARATUS FOR SPINNING A MULTIPHASE MOTOR FOR A DISK DRIVE SYSTEM FROM AN INACTIVE STATE

This is a division of application Ser. No. 09/643,218 filed Aug. 18, 2000.

BACKGROUND OF THE INVENTION

1. Technical Field of the Invention

This invention relates to improvements in circuitry for driving polyphase motors, and more particularly to improvements in circuitry for driving polyphase dc motors, and still more particularly to a method and apparatus for relatively rapidly driving a polyphase motor for a disk drive from an inactive state to an operable state for performing a memory access.

2. Background of the Invention

Although the present invention pertains to multiphase and/or polyphase dc motors, in general, it finds particular application in conjunction with three phase dc motors, particularly of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils connected in a "Y" configuration, although actually, a larger number of stator coils are usually employed with multiple motor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90 degrees. In operation, the coils are energized in sequences, in each of which a current path is established through two coils of the "Y" with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. In this manner, six commutation sequences are defined for each electrical cycle in a three phase motor.

In the past, during the operation of a polyphase dc motor for a disk drive system, such as a spindle motor for spinning the disk media upon which data is stored, it has been recognized that maintaining a known position of the rotor of the motor is an important concern. There have been various ways by which this was implemented. The most widely used way, for example, was to start the spindle motor in a known position, then develop information related to the instantaneous or current position of the rotor. One source of such instantaneous position information was developed as a part of the commutation process, and involved identifying the floating coil, and monitoring its back emf, that is, the emf induced into the coil as it moves through the magnetic field provided by the stator.

When the voltage of the floating coil crossed zero (referred to in the art as "a zero crossing"), the position of the rotor was assumed to be known. Upon the occurrence of this event, the rotor coil commutation sequence was incremented to the next phase, and the process repeated. The assumption that the zero crossing accurately indicated the rotor position was generally correct if the spindle motor was functioning properly, and nothing had occurred which would disturb its synchronization from its known startup position. However, in reality, events occur which sometimes result in a loss of synchronization. Such a loss of synchronization may occur, for instance, if the spindle motor of the disk drive is slowed due to a relatively prolonged absence of requests to access the disk drive. The motor controller of the disk drive must thereafter determine the state of the rotor in order to appropriately respond to the reception of a memory access request. In particular, the motor controller must relatively rapidly spin up and/or increase the spin of the motor to an operable spin level before the requested memory access can occur.

Conventional disk drive systems attempted to quickly spin up the spindle motor from an inactive state by initially tri-stating the phase windings of the motor for a sufficient period of time to detect at least two consecutive zero crossings of the back emf signals associated with the phase windings. In the event the rotor is spinning very slowly, the amount of time necessary to detect consecutive zero crossings may undesirably approach several hundred milliseconds. Once consecutive zero crossings of the back emf signals are detected, thereby indicating a spinning rotor, a resynchronization procedure is executed to synchronize to the rotor spin the application of drive signals to the motor's phase windings. In the event successive zero crossings of the back emf signals are not detected even after the lapse of several hundred milliseconds, an inductive sense routine is initiated to determine the position of the rotor, followed by executing a spin-up procedure to bring the spindle motor to the desired operable speed. Consequently, the delay related to returning rotor spin to operable levels may be excessive.

Based upon the foregoing, there is a need for a controller and method for controlling the motor of a disk drive to efficiently increase motor spin to operable spin speeds following periods of disk drive inactivity.

SUMMARY OF THE INVENTION

The present invention overcomes shortcomings in prior and existing disk drive systems and satisfies a significant need for high speed disk drive operation. According to a preferred embodiment of the present invention, a controller for a multiphase disk drive motor, such as the spindle motor, initially executes a sense operation following a period of disk drive inactivity so as to obtain an electrical characteristic of one or more phase windings of the motor. Having obtained the electrical characteristic, the controller determines whether or not the motor's rotor is spinning as well as the current position of the rotor. In the event the rotor is determined to be spinning, the controller then executes a resynchronization operation to synchronize the application of the drive signals to the already spinning rotor. In the event the controller determines that the motor's rotor is not spinning, a spin-up operation is executed by the controller to spin up the motor from the inactive state to an operable state. Because the time to execute the initial sense operation is substantially less than the time to execute the initial resynchronization operation in prior systems for a slowly moving rotor, the time to bring the rotor up to a spin level to suitably access the disk is markedly reduced.

BRIEF DESCRIPTION OF THE DRAWINGS

A more complete understanding of the system and method of the present invention may be obtained by reference to the following Detailed Description when taken in conjunction with the accompanying Drawings wherein:

FIG. 1 is a function block diagram of a system having a disk drive according to a preferred embodiment of the present invention;

FIG. 2 is a schematic diagram of the controller for the spindle motor of the disk drive of FIG. 1, in conjunction with the spindle motor's phase windings, according to a preferred embodiment of the present invention.

DETAILED DESCRIPTION OF THE PREFERRED EXEMPLARY EMBODIMENTS

The present invention will now be described more fully hereinafter with reference to the accompanying drawings in which a preferred embodiment of the invention is shown.

Figure 3:
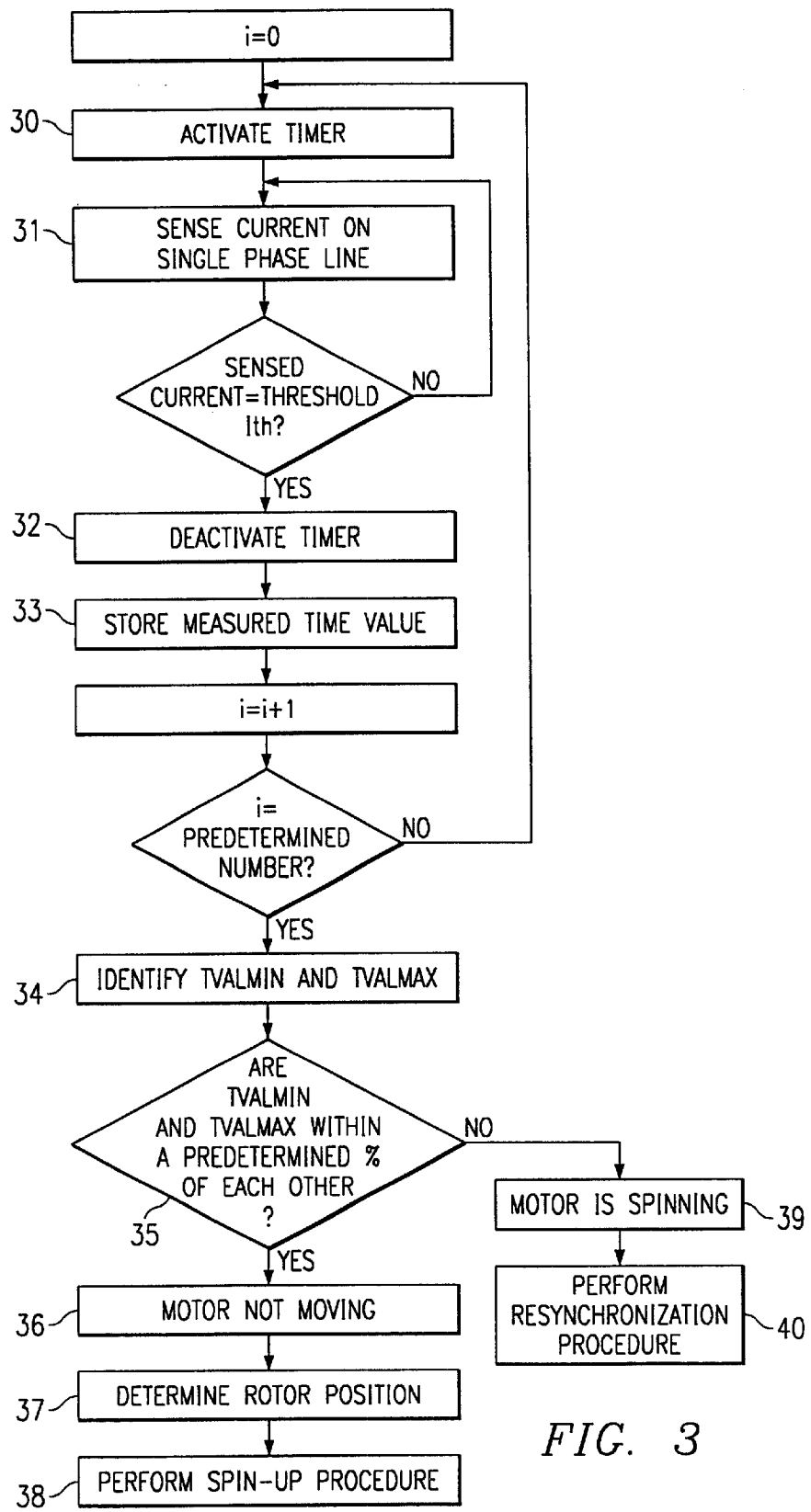
FIG. 3 is a flow chart illustrating the operation of the controller shown in FIGS. 1 and 2 in accordance with a first embodiment of the present invention.

Referring to FIG. 1, there is shown a block diagram of a data storage and/or computational system 1 including a disk drive 2 in accordance with the present invention. Disk drive 2 includes a storage medium in the form of one or more disks 3, each of which may contain data on both sides of the disk. Data is written to disks 3 and/or read therefrom by one or more read/write heads 4. The read/write head 4 is connected to an arm 5, with both read/write head 4 and arm 5 being positionally controlled by a voice-coil motor ("VCM") 6 and a position system 7. The position system 7, through VCM 6, positionally maintains and/or moves head 4 radially over the desired data on disks 3. A read channel 8 converts an analog read signal from head 4 into digital form. A write channel 9 provides data in analog form to read/write head 4 for storing on a disk 3. A pre-amplifier 10 suitably conditions data read from and data to be written to disk 4. Channel controller 11 recognizes and organizes the digital data from the read channel 8 and digital data to be sent to write channel 9 into bytes of data. An interface adapter 12 provides an interface between channel controller 11 and a system bus 13 that may be particular to the host system. The host system will also typically have other devices that communicate on system bus 13, including a central processing unit ("CPU") 14 and memory 15. A spindle motor ("SPM") 16 and SPM control circuit 17 rotate disk 3 and maintain disk 3 at the proper speed for performing a memory access operation (read or write operation). The SPM control circuit 17 may communicate with interface adapter 12, as shown in FIG. 1. Alternatively, SPM control circuit 17 may be controlled by or otherwise communicate with channel controller 11, as shown in dashed lines in FIG. 1. It is understood that disk drive 2 may be divided into and/or include other function blocks from those shown in FIG. 1, and that the particular function block implementations illustrated in FIGS. 2 and 3 are presented as an exemplary preferred embodiment of the present invention.

Referring to FIG. 2, there is shown SPM control circuit 17 for controlling spindle motor 16 of disk drive system 1 in accordance with a preferred embodiment of the present invention. The SPM control circuit 17 (hereafter referred to as the "controller 17") may directly communicate with interface adapter 12, as shown in FIG. 1.

Controller 17 preferably controls the sequence of drive signals applied to the input/output (I/O) terminals of phase windings or lines P1–P3 of motor 16 in order to, among other things, suitably spin motor 16 so that data stored on the associated media disk (not shown) may be accessed. It is understood, however, that controller 17 may be utilized in controlling the operation of a multiphase motor for other systems as well.

Controller 17 is preferably programmable to execute a number of operations. For example, controller 17 may be programmed to sense and/or measure current or another electrical characteristic appearing on one or more phase windings P1–P3 of the multiphase motor which can then be used to determine rotor position. Current sense measurements may be used to detect whether or not the rotor of motor 16 is spinning.

In addition, controller 17 may be programmed to execute a resynchronization operation in which drive signals to be applied to phase windings P1–P3 are synchronized with the position of a presently spinning rotor.

Controller 17 may include or otherwise be associated with a processing block 18 and lookup table 19 (FIG. 2). The lookup table 19 may be utilized to, among other things, store program instructions to be carried out by processing block 18 in controlling the operation of motor 16. Alternatively, controller 17 may include state machine circuitry (not shown) to sequentially step through a series of operations to control the operation of motor 16.

Further, processing block 18 may include sense circuitry 18A to measure current levels in phase windings P1–P3, and timing circuitry 18B to measure the amount of time that elapses for a phase winding current to reach a predetermined threshold level $I_{th}$. Processing block 18 may further include arithmetic circuitry 18C to compare various measured time values with each other, identify the smallest measured time value and determine whether spindle motor 16 is moving based upon the comparisons and identifications. The specific operation of controller 17 is described below.

Controller 17 may further include a predriver circuit 20 which, in general terms, receives control signals 21 from processing block 18 and derives drive signals 22 to be applied to phase windings P1–P3 of motor 16. Predriver circuit 20 may include memory and other circuitry (not shown) for utilizing any of a number of drive techniques for driving and/or controlling motor 16, such as pulse width modulation.

Controller 17 may further include a power driver circuit 23 which is adapted to receive an electrical signal from any terminal of phase winding P1–P3 that is not currently being driven, and send the received signal to processing block 18. Power driver circuit 23 also receives drive signals 22 from predriver circuit 20 and applies drive signals 22 to phase windings P1–P3 of motor 16.

The operation of preferred embodiments of the present invention will be described with reference to FIGS. 3–4. As discussed above, a disk drive 2 may undergo a relatively prolonged period of inactivity without having to respond to a request for memory access. During this period of inactivity in which the disk drive is in a "standby" state, the multiphase motor is undriven by controller 17. Consequently, motor 16 may considerably spin down to a relatively slow speed and in some instances stop spinning altogether. In order to relatively rapidly ramp up motor 16 from a standby state in response to a request for memory access, controller 17 initially senses or measures an electrical characteristic of at least one phase winding or line of motor 16 to determine whether or not the motor's rotor is spinning.

In one embodiment of the present invention, timing circuitry 18B is initialized and activated to begin counting at step 30 (FIG. 3) and sense circuitry 18A senses current on a single phase winding (P1, P2 or P3) at step 31 at that time, until the sensed current reaches and/or surpasses a predetermined threshold current level $I_{th}$. At that point, timing circuitry 18B is deactivated at step 32 and the measured time value Tval is temporarily stored at step 33.

Steps 30–33 are repeated a predetermined number of times corresponding to the same phase winding P1, P2 or P3. The maximum measured time value $Tval_{max}$ and minimum measured time value $Tval_{min}$ are identified (at step 34) and compared to each other (at step 35) by arithmetic circuitry 18C. If the minimum measured time value $Tval_{min}$ is within a predetermined percentage of maximum measured time value $Tval_{max}$, then processing block 18 determines that the motor 16 is not spinning at step 36. Next, the position of the rotor of motor 16 is then determined at step 37. Having information relating to the position of stationary motor 16, a spin-up operation is performed at step 38 so as to spin the rotor and bring the spin speed thereof to an operable level at which a memory access operation may occur. By eliminating an initial resynchronization operation and instead initially performing a sensing operation immediately followed by a spin-up operation, controller 17 is capable of bringing the disk drive from a standby state to an operable state much more rapidly than experienced in prior disk drive systems.

If the minimum measured time value $Tval_{min}$ is not within the predetermined percentage of maximum measured time value $Tval_{max}$, then processing block 18 determines that the motor 16 is spinning at step 39 and executes a resynchronization operation at step 40 to synchronize and/or resynchronize the application of drive signals to the spinning motor 16. In this way, the spin of the rotor will be smoothly increased upon application of the drive signals.

A second embodiment of the present invention utilizes an inductive sense operation in sensing one or more electrical characteristics of motor 16. In particular, timing circuitry 18B is initialized and activated to begin counting at step 42 (FIG. 4), and sense circuitry 18A senses current from a phase winding during a first commutation sequence at step 43 until the sensed current reaches and/or surpasses the predetermined threshold current level $I_{th}$. At that point, timing circuitry 18B is deactivated at step 44 and the measured time value Tval is temporarily stored at step 45.

Steps 42–45 are repeated for each of the six commutation sequences or phases of a first commutation cycle, so that six measured time values Tval are obtained. Next, the minimum measured time value corresponding to the first commutation cycle Tvalmin(1) is determined at step 46. Steps 42–46 are then repeated for a second commutation cycle. In this way, a second set of six measured time values Tval are obtained corresponding to the second commutation cycle, and minimum measured time value Tval(2) determined therefrom. It is understood that steps 42–46 may be repeated for any number of commutation cycles.

The minimum measured time values Tvalmin(1) and Tvalmin(2) are then compared to each other at step 47. If the minimum measured time value Tvalmin(1) is approximately equal to the minimum measured time value Tvalmin(2), then a determination is made at step 48 that motor 16 is not spinning. Alternatively, if the minimum measured time value Tvalmin(1) is not approximately equal to the minimum measured time value Tvalmin(2), then a determination is made at step 49 that motor 16 is not spinning. The inductive sense operation is complete following the determination of whether or not motor 16 is spinning.

Next, the position of the rotor of motor 16 is determined in step 50 following a determination that motor 16 is not spinning. A spin-up procedure is performed thereafter at step 51 so as to spin the rotor and bring the spin speed thereof to an operable level at which the memory access operation may occur. A resynchronization operation is executed at step 52 following a determination that the that motor 16 is spinning. The resynchronization operation synchronizes or resynchronizes the application of drive signals to motor 16 so that the spin of the rotor is smoothly increased to operable spin levels.

Figure 4:
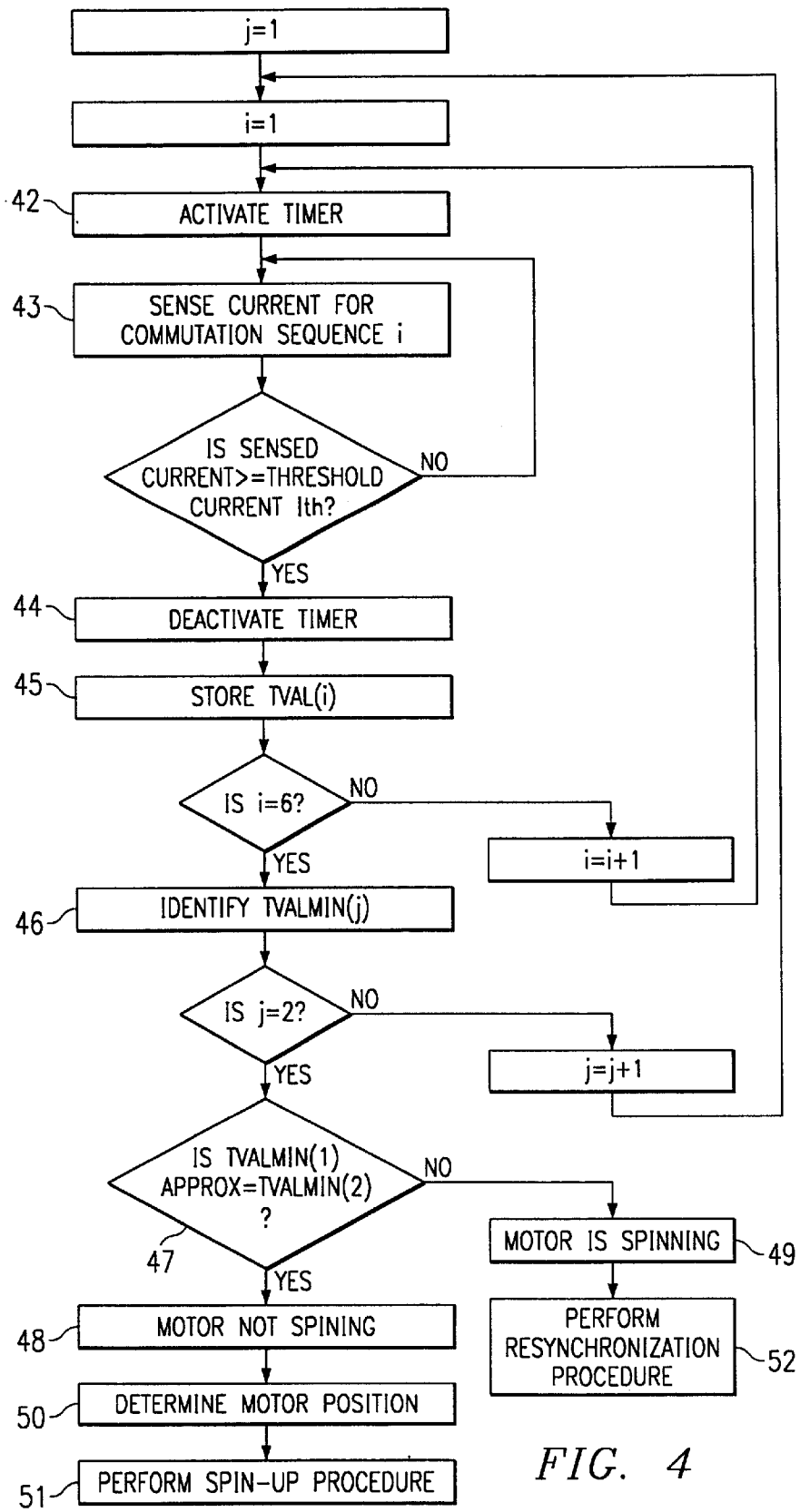
FIG. 4 is a flow chart illustrating the operation of the controller shown in FIGS. 1 and 2 in accordance with a second embodiment of the present invention.

As can be seen, the operation illustrated in FIG. 3 in accordance with a first embodiment of the present invention can be performed faster than the operation illustrated in FIG. 4 in accordance with a second embodiment of the present invention. This is because only a few current sensing steps are preformed on a single phase winding, relative to the number of current sensing steps performed during each commutation phase of multiple commutation cycles as shown in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of spinning a multiphase motor of a disk drive having a rotor and phase windings from an undriven state, comprising the steps of:

initially sensing an electrical characteristic of at least one phase winding of the motor during a commutation cycle of the motor;

during the commutation cycle, measuring a plurality of time values corresponding to the electrical characteristic sensed;

comparing a minimum time value and a maximum time value from the plurality of time values measured during the commutation cycle;

determining whether the motor is spinning based on the comparison; and selectively performing a spin-up procedure on the motor upon a determination that the rotor is not spinning.

2. The method of claim 1, further comprising the step of:

determining a position of the rotor.

3. The method of claim 1, further comprising the step of:

synchronizing an application of drive signals for the phase windings of the motor to the position of the rotor upon a determination that the rotor is spinning during the step of sensing; and sequentially applying the drive signals to the phase windings of the motor following the step of synchronizing.

4. The method of claim 1, further comprising the steps of:

performing a resynchronization procedure to synchronize signals for driving the phase windings of the motor to the position of the rotor, upon a determination that the rotor is spinning during the step of sensing an electrical characteristic.

5. The method of claim 1, further comprising the step of:

sensing the electrical characteristic of the at least one phase windings in one or more commutation sequence in the commutation cycle; and measuring a time value for each commutation sequence in which the electrical characteristic is sensed to obtain the plurality of time values.

6. The method of claim 1, wherein the step of comparing comprises the steps of identifying the minimum time value and the maximum time value corresponding to the one or more commutation sequence in the commutation cycle; and determining whether the identified minimum time value and the identified maximum time value for the commutation cycle are within a predetermined percentage of each other.

7. A controller for a multiphase motor, the multiphase motor including a plurality of phase windings and a rotor, comprising:

a first circuit for initially sensing at least one electrical characteristic of one or more phase windings of the motor during a commutation cycle, measuring time values corresponding to the at least one electrical characteristic during the commutation cycle to obtain a plurality of measured time values, comparing a minimum measured time value and a maximum measured time value from the commutation cycle, and determining whether the rotor is spinning based upon the comparison, and a second circuit, having at least one input for receiving the control signal from the first circuit, for selectively performing a spin-on operation on the motor upon the determination by the first circuit that the rotor is not spinning.

8. The controller of claim 7, wherein:

the first circuit performs an inductive sense operation in sensing the at least one electrical characteristic during the commutation cycle.

9. The controller of claim 7, wherein:

the first circuit further determines a position of the rotor.

10. The controller of claim 7, wherein:

the first circuit determines that the rotor is spinning based upon the comparison between the minimum measured time value corresponding to one or more commutation sequence in the commutation cycle is not within a predetermined percentage of the maximum measured time value determined from the commutation cycle.

11. The controller of claim 7, wherein:

the second circuit selectively performs a resynchronization operation upon a determination by the first circuit that the rotor is spinning.

12. A disk drive system, comprising:

at least one disk on which data is stored;

at least one head positioned proximally to the disk;

channel control circuitry for positioning the head in a desired position relative to the disk, receiving data sensed by the head during a read operation and placing data on the head during a write operation;

a multiphase spindle motor, connected to spin the disk, having a rotor and a plurality of phase windings; and spindle motor control circuitry, connected to the phase windings of the spindle motor, for controlling the spindle motor, the spindle motor control circuitry being responsive to a request for performing a memory access following a period of disk drive inactivity by initially sensing an electrical characteristic of one or more phase windings of the spindle motor during a commutation cycle thereof, measuring a plurality of measured time values corresponding to the at least one electrical characteristic during the commutation cycle, comparing a minimum measured time value and a maximum measured time value from the commutation cycle, determining whether the minimum measured time value and the maximum measured time value for the commutation cycle are within a predetermined percentage of each other, and selectively performing a spin-on procedure on the spindle motor upon a determination that the rotor is not spinning.

13. The disk drive system of claim 12, wherein:

the spindle motor control circuitry further determines a position of the rotor in the event the rotor is not spinning.

14. The disk drive system of claim 12, wherein:

the spindle motor control circuitry, upon a determination that the rotor is spinning, executes a resynchronization operation to resynchronize drive signals for the phase windings of the spindle motor to determined spin of the rotor.

15. The disk drive system of claim 12, wherein:

the spindle motor control circuitry senses current during one or more commutation sequences in the commutation cycle, measures a time value for the current sensed in the one or more commutation sequences for the commutation cycle, selects the measured time value associated with the commutation cycle, and determines whether the rotor is spinning based upon a comparison of the selected measured time values.

16. The disk drive system of claim 12, wherein:

the spindle motor control circuitry determines a position of the rotor based upon the comparison.

* * * * *